(12) United States Patent
Wu et al.

(10) Patent No.: US 8,457,400 B2
(45) Date of Patent: Jun. 4, 2013

(54) PATCH-BASED TEXTURE HISTOGRAM CODING FOR FAST IMAGE SIMILARITY SEARCH

(75) Inventors: Lei Wu, Anhui (CN); Mingjing Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1345 days.

(21) Appl. No.: 12/147,832

(22) Filed: Jun. 27, 2008

(65) Prior Publication Data

US 2009/0324077 A1    Dec. 31, 2009

(51) Int. Cl.
*G06K 9/00*    (2006.01)
(52) U.S. Cl.
USPC ............................................ 382/170
(58) Field of Classification Search
USPC ............... 382/168, 170, 181, 190, 224–228, 382/162, 108, 305, 100; 707/723, 698, 758, 707/790–813; 725/28; 345/582, 589–600
See application file for complete search history.

(56) References Cited

U.S. PATENT DOCUMENTS

| | | |
|---|---|---|
| 5,579,471 A | 11/1996 | Barber et al. |
| 5,802,361 A | 9/1998 | Wang et al. |
| 6,154,566 A | 11/2000 | Mine et al. |
| 6,373,979 B1 | 4/2002 | Wang |
| 6,718,063 B1 | 4/2004 | Lennon et al. |
| 6,826,316 B2 | 11/2004 | Luo et al. |
| 7,027,644 B1 | 4/2006 | Kim et al. |
| 7,043,474 B2 | 5/2006 | Mojsilovic et al. |
| 7,062,083 B2 | 6/2006 | Lim et al. |
| 7,215,791 B2 | 5/2007 | Krishnamachari |
| 7,454,058 B2 * | 11/2008 | Porikli .......................... 382/168 |
| 7,929,775 B2 * | 4/2011 | Hager et al. ................... 382/224 |
| 7,949,186 B2 * | 5/2011 | Grauman et al. ............. 382/170 |
| 8,090,222 B1 * | 1/2012 | Baluja et al. .................. 382/305 |
| 8,126,274 B2 * | 2/2012 | Li et al. ......................... 382/224 |
| 8,156,132 B1 * | 4/2012 | Kaminski, Jr. ................ 707/758 |
| 8,229,219 B1 * | 7/2012 | Ioffe .............................. 382/168 |
| 2005/0041863 A1 * | 2/2005 | Ray et al. ...................... 382/181 |
| 2006/0015496 A1 | 1/2006 | Keating et al. |
| 2007/0174865 A1 * | 7/2007 | Jing et al. ......................... 725/28 |
| 2012/0180084 A1 * | 7/2012 | Huang et al. .................... 725/32 |

OTHER PUBLICATIONS

Efros, et al., "Image Quilting for Texture Synthesis and Transfer", available at least as early as Oct. 10, 2007, at <<http://www.eecs.berkeley.edu/Research/Projects/CS/vision/papers/efros-siggraph01.pdf, pp. 6.
Lv, et al., "Image Similarity Search with Compact Data Structures", at <<http://www.cs.princeton.edu/cass/papers/LCL04.pdf>>, ACM, 2004, pp. 10.
Suharno, "Finding Similarity Between Images", at <<http://www.codeguru.com/Cpp/G-M/bitmap/article.php/c4885/>>, Jupitermedia Corporation, Sep. 18, 2002, pp. 4.

(Continued)

*Primary Examiner* — Ishrat I Sherali
(74) *Attorney, Agent, or Firm* — Lee & Hayes, PLLC

(57) ABSTRACT

Techniques for identifying copied images based on an original image are described. The identifying copied image is based on creating unique and identifiable features that in turn are used to generate multiple histograms. The histograms are generated by patches of the image, where the patches are created by equally dividing the image. The combined patch histograms are representative of the image.

19 Claims, 7 Drawing Sheets

OTHER PUBLICATIONS

Wu, et. al., "Query Subspace Shifting for Near-Duplicate Image Detection", IEEE 2008.

The Extended European Search Report mailed Jun. 5, 2012 for European patent application No. 09771222.8, 7 pages.

The Chinese Office Action mailed Oct. 19, 2012 for Chinese patent application No. 200980134639.6, a counterpart foreign application of U.S. Appl. No. 12/147,832, 12 pages.

* cited by examiner

PATCH-BASED TEXTURE HISTOGRAM CODING FOR FAST IMAGE SIMILARITY SEARCH

BACKGROUND

Digital pictures or digital images, like other works of arts, provide copyrights to their owners. Digital images are easily accessed, transferred, downloaded, and manipulated by authorized and unauthorized parties. For example, by simply visiting a website, parties are able to copy digital images without authorization of the copyright owner. Furthermore, digital images may also be easily exchanged between parties, without the consent of the copyright owner. In many instances, unauthorized copied digital images may be considered pirated works or pirated images.

In certain instances, it is desirable to search for digital images that are copies of an original digital image. Such a search may, or may not, be to determine if the copied image(s) is/are pirated or not. Attempts may be made to search from thousands, if not millions of images, for copied images, which can amount to considerable effort or task.

Techniques to search for copied images, including detecting copied or pirated images, include watermark schemes; however watermark schemes and certain other searching schemes may be inefficient, when content of an original image (i.e., copyrighted image) is modified. To detect slightly modified images or near, different schemes or techniques are needed.

SUMMARY

This summary is provided to introduce concepts relating to remote auto provisioning and publication of applications. These concepts are further described below in the detailed description. The presented summary is not intended to identify essential features of the claimed subject matter, nor is it intended for use in determining the scope of the claimed subject matter.

In an implementation, an image is divided into multiple patches, and histograms are created for each patch. The multiple histograms are combined to represent the image. Histograms are unique to each image. Therefore copied images may be found by analyzing histograms of the images.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
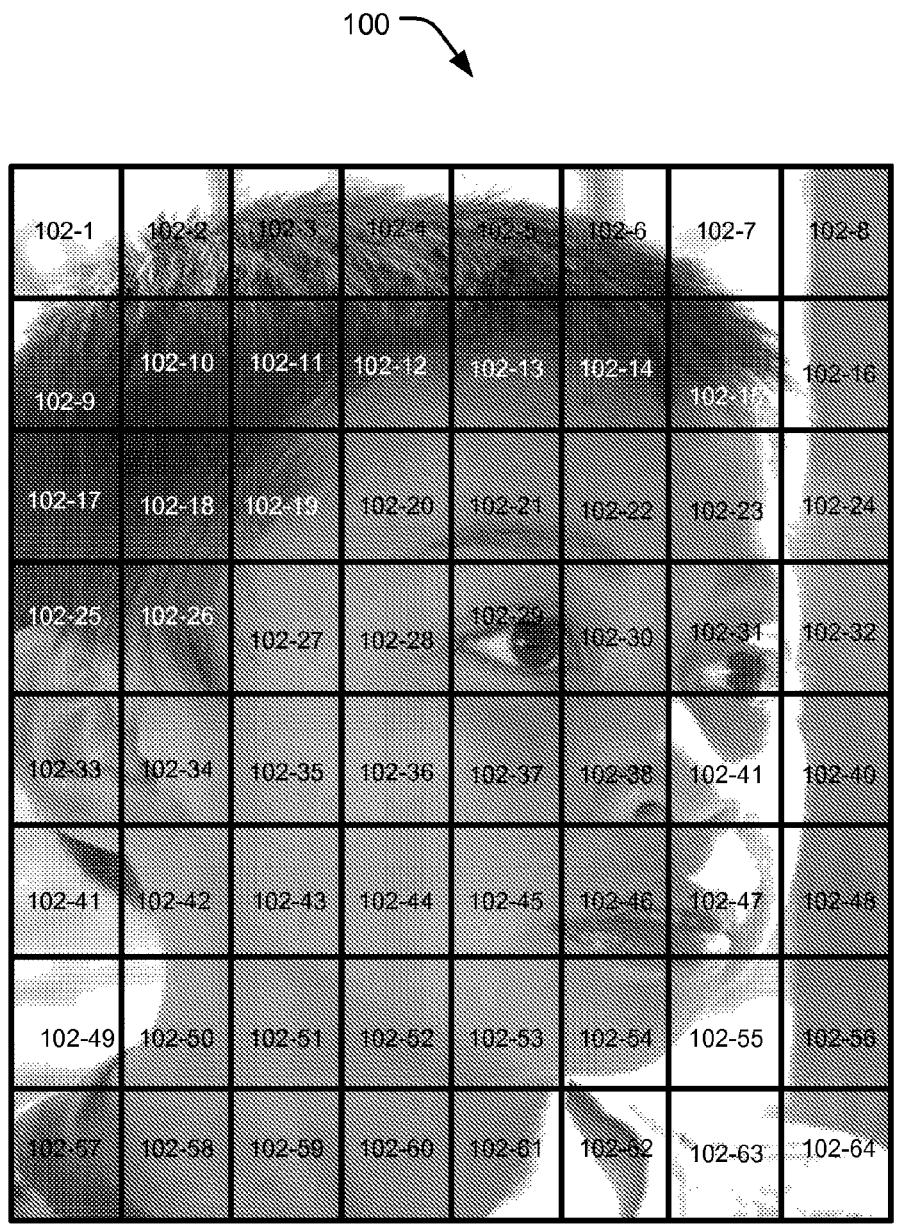
FIG. 1 is a diagram illustrating an exemplary image that is divided into 8 by 8 or 64 patches.

Given an original digital image (i.e., copyrighted image) as a query, duplicate or near duplicate images, or copied images may be found by content analysis. To find such images, a Content Based Image Retrieval or CBIR scheme may be implemented. For such a CBIR scheme, a digital image (i.e., an original image) may be represented by a feature vector. Similarity between images may be defined as distance in a feature space. Given an original image, other similar images (i.e., copied images) may be retrieved by such a CBIR scheme. Similar images may then be judged by other methods to determine whether they are copied images or not.

Two issues in copy or near duplicate detection are efficient image features and similarity measurement. Features used in large-scale near-duplicate detection may include ""mean gray"", color histogram, texture histogram, etc. For similarity measurement, distance functions as known in the industry may be implemented, such as Minkowski metrics, histogram cosine distance, fuzzy logic, etc.

A large-scale duplicate detection algorithm or scheme, as further described below, may be implemented. The scheme divides an original image into patches, and can use a ""mean gray"" of each patch as a feature. A hash code, one of many as known in the industry, can be generated from the most distinguishing feature dimensions picked by Principle Component Analysis or PCA to facilitate fast similarity comparison, where PCA and its use is known. In an implementation, Hamming distance may be used for similarity measurement.

Because the distinguishing features picked by PCA may only characterize the whole dataset, the specific property of the query image may not be well utilized. Therefore, similarity measurement may be dynamic according to the query image (i.e., original image), and a query oriented subspace shifting method may be implemented to detect near-duplicates or copied images.

In an implementation, a special hash code may be used for both image representation and fast similarity search. An original image is first segmented into 8 by 8 (i.e., 64) blocks or patches, and the average brightness of each patch may be taken as a feature dimension, resulting in a 64 dimension feature vector, which may be further reduced into 32 dimensional feature vector by PCA. Each dimension may then be quantized into a binary value according to whether the dimension is above a mean value or not. In this way, the image may be represented by a 32-bit hash code. The Hamming distance between two hash codes is taken as the similarity measure of two images. Based on this method, similar images may be detected very quickly.

In certain cases, the above scheme may not be able to detect copied or pirated images effectively in certain instances. A pirated image may have a slight difference in color, contrast, and/or saturation from the original image. These changes might change the average brightness of an image block significantly, and result in a different hash code, causing a failure in image detection.

A patch-based texture histogram coding method to measure the similarity between images may be implemented, as described in further detail below. Such a patch-based texture histogram coding method may be insensitive to color change issues as discussed above.

Figure 2:
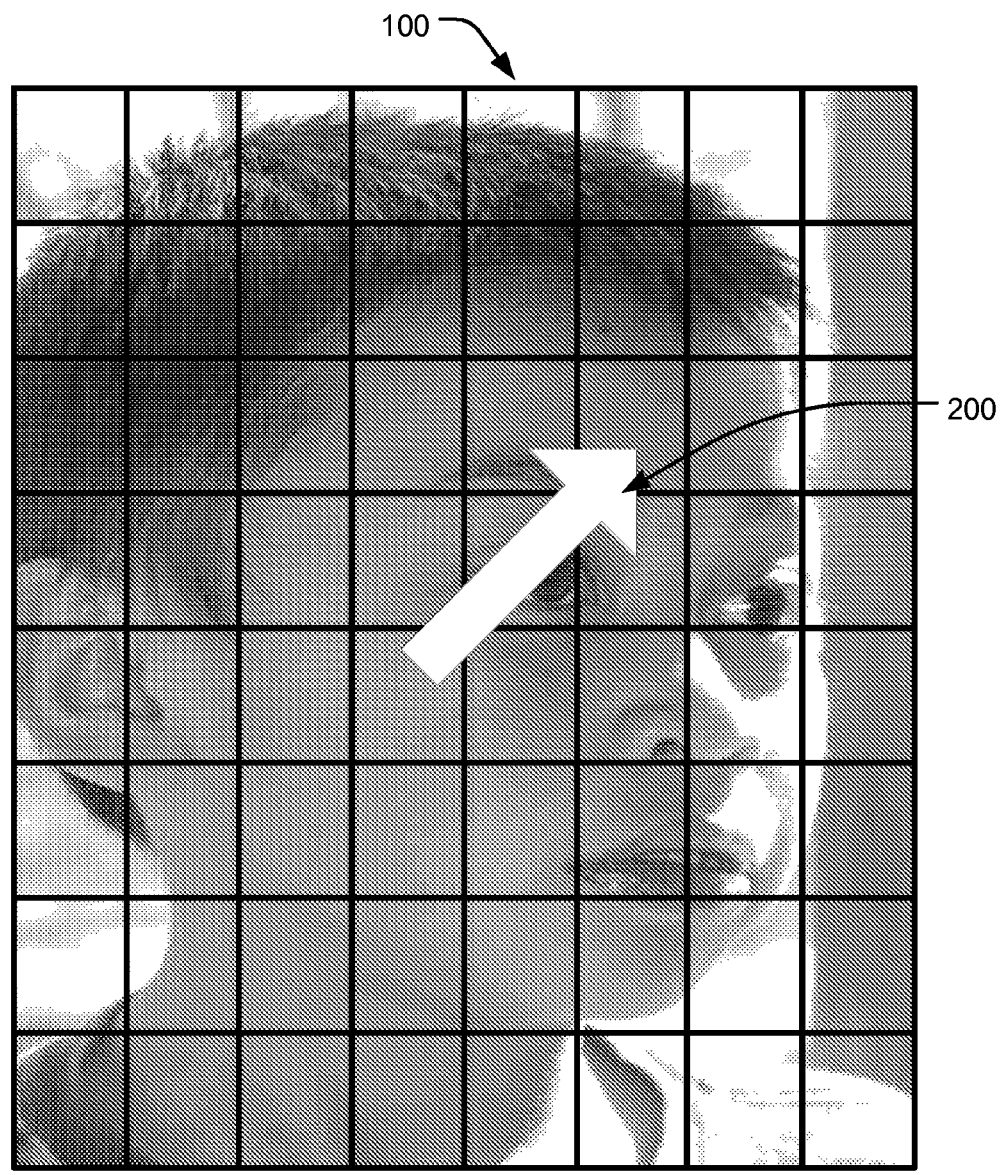
FIG. 2 is diagram illustrating an exemplary image and a dominant gradient direction
Figure 3:
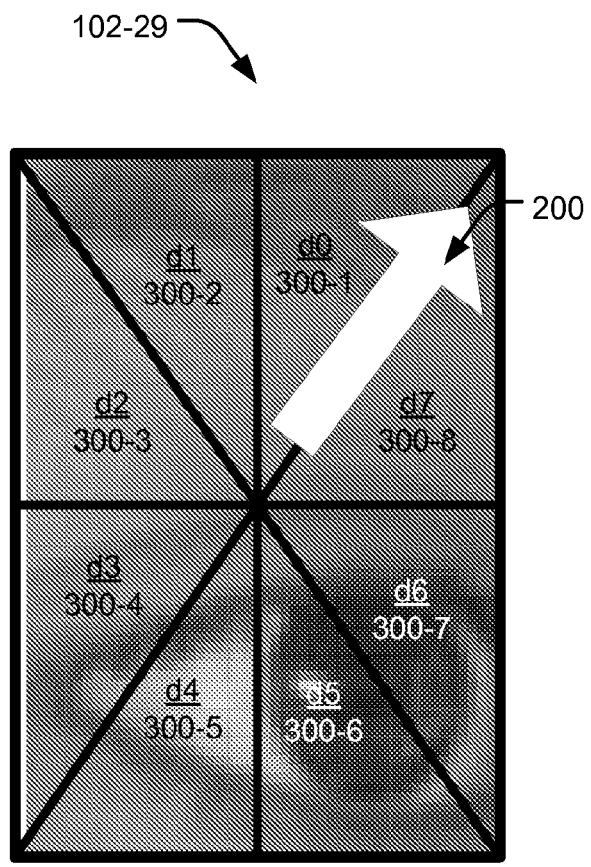
FIG. 3 is a diagram illustrating an exemplary patch segmented into eight texture directions.

FIG. 1 shows an original image 100. Image 100 may also be considered a query image. Image 100 may be part of a collection of original images that are identified as copyrighted or protected images. The image 100 is divided into 8 by 8 or 64 equal-sized patches 102-1 to 102-64. FIG. 2 shows a dominant gradient direction 200 referred to as ""D"" in the equations described below. FIG. 3 shows an example patch 102-129 segmented into eight texture directions d0 300-1; d1 300-2, d2 300-3, d3 300-4, d4 300-5, d5 300-6, d6 300-7, and d8 300-8.

Now referring back to FIG. 1 and FIG. 2, within each patch 102, the dominant gradient direction 200 of texture gradient is calculated. Then the patch 102 is rotated according to the dominant direction 200. Afterwards, the texture histogram of the eight different directions as shown in FIG. 3 is calculated as discussed below.

In the following equations, I represents an image, such as image 100. $I_{i,j}$ is defined as the i, j pixel value of the image (i.e., image 100). The gradient magnitude of the i, j pixel is $m_{i,j}$; The value $d_{i,j}$ represents the gradient direction at pixel i, j. The $k^{th}$ dimension h(k) of a texture histogram represents the total intensity of the pixel gradient whose direction lies in the $k^{th}$ direction bin $d_k$, k=0, . . . , 7 (i.e., d0 300-1 . . . , d7 300-8). The direction bins 300 are defined by the relative angle to the dominant gradient direction 200.

This provides for extraction of texture histogram feature from each image patch 102, where the feature is robust to patch 102 rotation, image scale change, and color change.

Generation of hash code based on texture histogram features is performed and instead of using one histogram to represent the image 100, multiple patch (i.e., patches 102) histograms (e.g., 400) are combined. Such a representation considers global information of the image 100, as well as the spatial distribution of the features of image 100, which is robust to color and size modification, while sensitive to different images. The patch histogram features may be coded in 32-bit hash code, making the method efficient.

For each patch 102, an 8-bin texture histogram h(k), k=0, . . . , 7 is calculated based on the following equations.

$$h(k) = \sum_{d_{ij} \in d_k} m_{ij} \quad (1)$$

$$m_{ij} = \sqrt{dx_{ij}^2 + dy_{ij}^2} \quad (2)$$

$$d_{ij} = \arctan\frac{dy_{ij}}{dx_{ij}} \quad (3)$$

$$dx_{ij} = I_{ij} - I_{i+1,j} \quad (4)$$

$$dy_{ij} = I_{ij} - I_{i,j+1} \quad (5)$$

$$D = \arctan\frac{\sum_{ij} dy_{ij}}{\sum_{ij} dx_{ij}} \quad (6)$$

The dominant gradient direction 200 defined by equation (6), where the dominant gradient direction 200 or D is defined as the direction of the average gray gradient vector.

After D is calculated or defined, a patch 102 (e.g., 102-29 of FIG. 3) is rotated according to its dominant direction 300 to make the dominant direction horizontally pointing to the right. Then, eight texture directions 300 are defined. The direction d0 300-1 is chosen as the dominant direction, and di, where "i" is 1, 2, 3, 4, 5, 6 or 7 (corresponding to d1 300-2, d2 300-3, d3 300-4, d4 300-5, d6 300-7, and d7 300-8) is chosen with i*45 degree clock-wise to d0 300-1.

Figure 4:
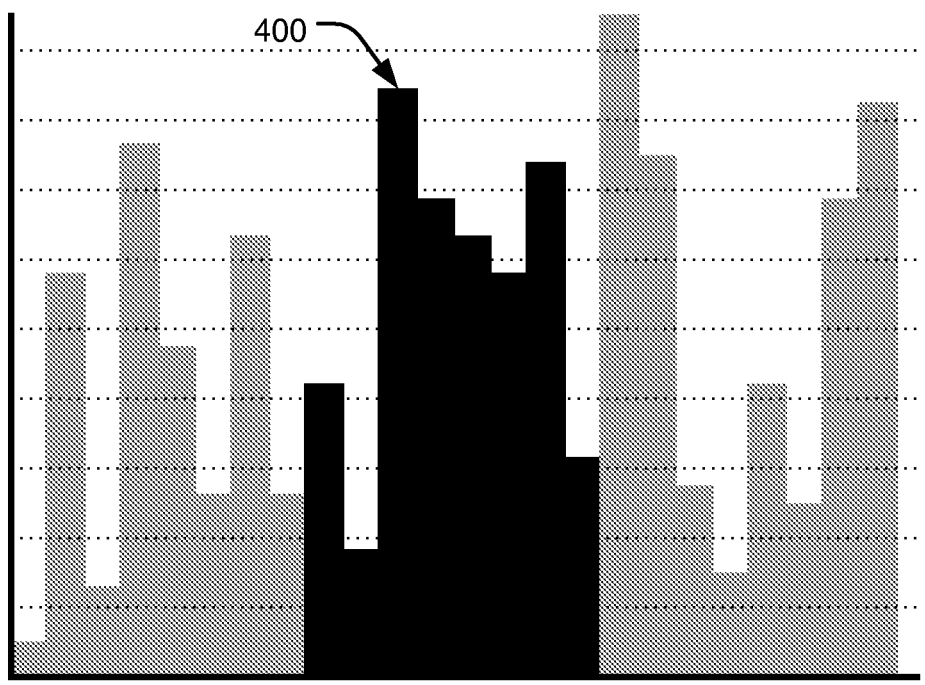
FIG. 4 is diagram of an exemplary texture histogram of a patch of an image.

FIG. 4 shows an exemplary texture histogram represented of patch 102-29. The texture histogram 400 by quantizing the gradient direction of each pixel into one of 8 directions as shown in FIG. 3, and summing its gradient magnitude to that direction over each patch. The gradient magnitude and direction of each pixel is defined by equations (1), (2), and (3) above.

To represent an image, patch histograms (e.g., histogram 400) as described and calculated above are combined to form an n*n*8 dimensional feature. Therefore, if n=8, a 512 dimensional feature vector may be formed.

PCA may then be used to reduce the dimension to 32. A 32-bit hash code, as described below, may be used to represent the feature in further compact form. Each bit of the hash code denotes whether the corresponding dimension is above or below an average level. In this way, an image may be represented as a compact 32-bit hash code.

Hash Coding

In consideration of efficiency and robustness to noise, PCA may be applied to project the image feature to a lower dimensional space (i.e., subspace). A projection matrix is prepared based on a sufficiently large image collection. PCA may provide that the features are projected along the most distinguishing "d" dimensions. Because the projection matrix does not change with a query image, the projection matrix may be referred to as a "static" or a static projection matrix.

In the lower dimensional space, the image 100 is able to be represented by a further compact hash code to reduce the calculation burden in similarity measurement. An example hash code method is described in "Large-scale duplicate detection for web image search", by B. Wang et al, published in the Proc. Of IEEE International Conference on Multimedia & Expo (ICME), 2006.

Overall for such a hash coding, the following is applied. $C_{ik}=0$, if $v_{ik}>mean_k$, and $C_{ik}=1$ otherwise. $C_{ik}$ is the $k^{th}$ bit of the hash code for image i (e.g., image 100), and $v_{ik}$ is the $k^{th}$ dimension of the feature vector for image i; $mean_i$ is the mean of the $i^{th}$ dimension of the feature vector over all the images.

The hash code generation is a vector quantization process. As the final quantized vector has K bits, allocation of the bits to each dimension should be determined. One method of allocation is to allocate one (1) bit for each K dimension as follows, where H is hash code, and G is grouping. $H_{ik}=1$, if $G_{ik}>mean_k$, and $G_{ik}\leq mean_k$ otherwise, where $mean_k$ is the mean value of dimension k. A K-dimension feature vector is transformed into a K-bit binary string, which is the image's hash code. K may be constrained to no more than 32.

Hash coding and the use of hash codes may be used to categorize or group duplicate images. For vector quantization, a problem may be threshold operation. Some drifting near a boundary can change a quantized value. To improve performance, similar hash codes with small "difference" may be grouped together instead of identical ones. The difference may be indicated by a Hamming distance between two binary strings. In PCA, drifting may be more likely to occur in less significant dimensions than in more significant dimensions. In order to recall, as well as retain precision, criterion for similar hash codes is for the most significant L bits to be identical while a small variance is allowed in least significant K-L bits.

Detection

A "rough filtering" or selection may be performed for better proficiency. For a large scale data set, a complex similarity search algorithm may not be applied, because of limited computational resources. Therefore, an efficient rough filtering may be used to reduce the scale of the collection. Such a process may make use of hash code matching by Hamming distance, where a loose threshold is set on the hash code distance to exclude the images which are obviously different from the query image q.

For example, if the query image q, is q∈R$^n$. An image I$_j$ is calculated to be close the query image q, if and only if the following applies.

$$\|H(Pq)-H(PI_j^{(l)})\|_\kappa < \epsilon \quad (7)$$

where P is the static projection matrix for rough filtering. H(•) is the hash coding function. "κ" represents the corresponding subspace, and ε is the threshold to determine whether the image is close to the query or not in the subspace. The set of samples which are close to the query may be referred to as query surrounding samples. The query surrounding images form the query surrounding collection Q$_s$.

In order to determine the loose threshold ε for rough filtering, several random transformations (or query expansion) may be generated from each query image and represented in hash code in the same sub-space projected with the static PCA matrix. The largest Hamming distance between the query and its expansions is set as the threshold.

$$\epsilon = \max_l \|Pq_j - Pq_j^{(l)}\|_\kappa \quad (8)$$

where q$_j^{(l)}$ is the l$^{th}$ random transformation of the query image q$_j$.

Query Oriented Subspace Shifting

Sine hash code matching may provide a smaller query surrounding collection, an iterative scheme to detect the near-duplicates from the collection may be implemented. For each iteration, PCA eigenspace of the query surrounding samples is selected as the optimal subspace for measuring the similarity among the query surrounding samples. This subspace keeps as much of the variance of the collection as possible. The remote samples will then be excluded from the query surrounding collection. As the collection is updated, the eigenspace will shift. Therefore, in the next iteration, the similarity measurement will be performed in another eigenspace. It is probable that the near-duplicates would remain close to the query after the subspace has shifted, while non-duplicated images which may form a cluster in a previous subspace will scatter in the subsequent spaces. This process is presented as follows.

(1) Calculate the closeness threshold in the subspace ε by the query expansion described in the above rough filtering.

(2) Select the query surrounding samples and update the Q$_s$ as follows:

$$Q_s = \{I_j | \|PQ - PI_j\|_\kappa < \epsilon\} \quad (9)$$

(3) Update the projection matrix P based on the query surrounding collection, as follows.

$$P_i \leftarrow \text{eigenvector}(\text{cov}(Q_s),i) \quad (10)$$

$$P = [P_0, P_1, \ldots, P_d] \quad (11)$$

where eigenvector(cov(Q$_s$), i) is the i$^{th}$ sorted eigenvector of the covariance matrix for query surrounding collection, and d is the dimension of the low dimensional space.

(4) Repeat (1) and (3), until the query surrounding collection Q does not change. In likelihood, non-duplicates surrounding the query image are filtered, and the process/algorithm finishes.

The threshold ε in each iteration is calculated in the same way as the rough filtering or step (1). The only variation is the projection matrix P. Therefore, the threshold is adaptive to the query in different subspaces.

Exemplary Methods

Exemplary processes for remote auto provisioning and publication of applications are described with reference to FIGS. 1-4. The processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 5:
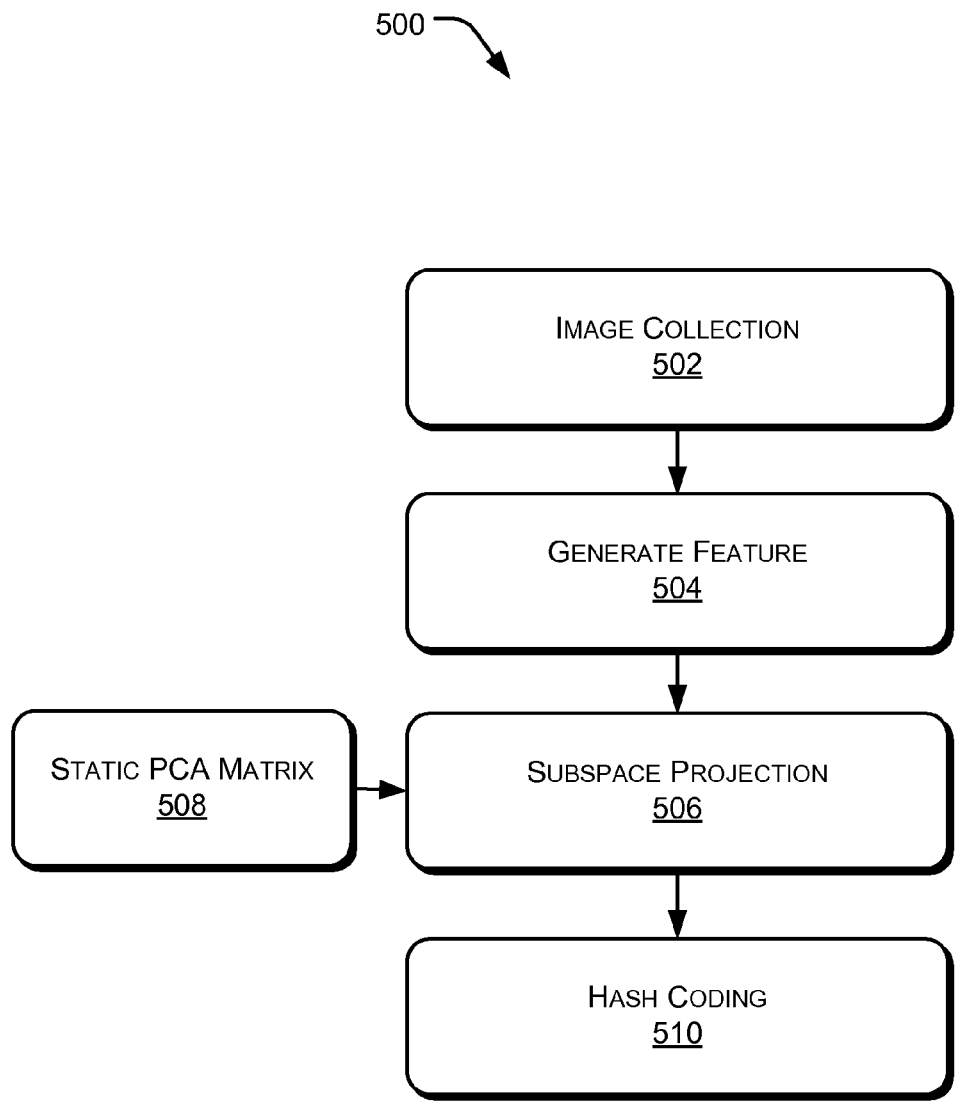
FIG. 5 is a flowchart illustrating an exemplary process for indexing images.

FIG. 5 illustrates an exemplary method 500 for indexing digital images that may be queried or compared against copied or pirated images. Process 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method can be implemented in any suitable hardware, software, firmware, or a combination thereof, without departing from the scope of the invention.

At block 502, collecting is performed for one or more digital images. The digital images may be protected or copyrighted original images, and may be part of a collection of images. The images may be used later for querying and determination as to copied or pirated images.

At block 504, generating of features for each of the images is performed. As described above, the generating of features may include generating or more histograms of a number a patches for a given image.

At block 506, projecting may be performed for the image to a lower dimensional space or subspace, or what may be termed subspace projection. As described above, in certain implementations, PCA may be applied to project the image feature to a lower dimensional space (i.e., subspace). A projection matrix is prepared based on a sufficiently large image collection. PCA may provide that the features are projected along the most distinguishing "d" dimensions.

At block 508, projecting of a static PCA matrix may be performed. As described above, because the projection matrix may not change with a query image, the projection matrix may be referred to as a "static" or a static projection matrix.

At block 510, a hash coding may be performed for each of the images. The hash coding may be implemented as described above. The hash coding and the use of hash codes may be used to categorize or group duplicate images in consideration of efficiency.

Figure 6:
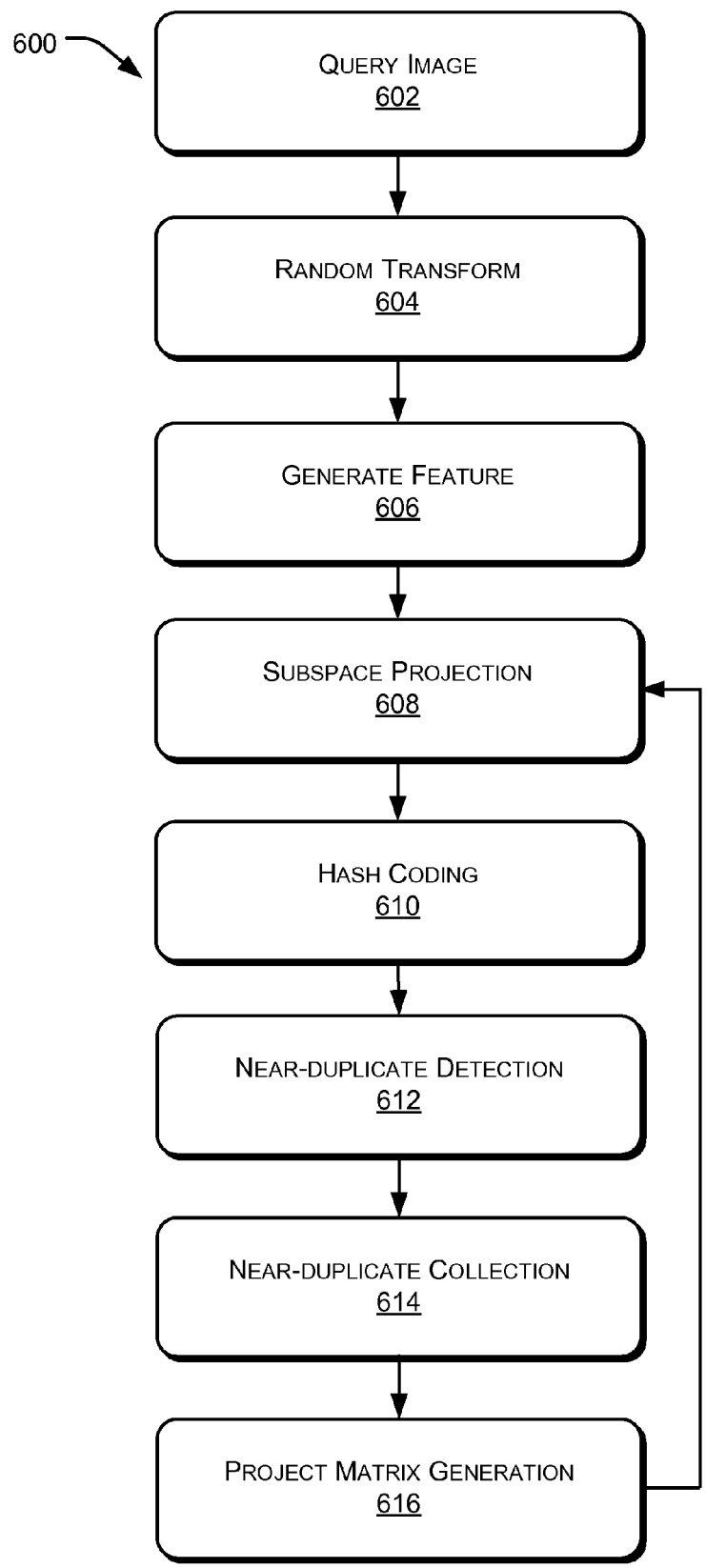
FIG. 6 is a flowchart illustrating an exemplary process for detecting copies of images.

FIG. 6 illustrates an exemplary method 600 for detecting copied or pirated images. Process 600 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations.

At block 602, querying is performed as based on a known original image. The known image is defined as a query image, and is used or compared with a number of images which may be copies.

At block 604, a random transform is performed. As described above, rough filtering may be implemented using a loose threshold. Several random transformations may be generated from each query image and represented in hash code in the same sub-space projected, may be with a static PCA matrix. The largest Hamming distance between the query and its expansions is set as the threshold.

At block 606, generating of features if performed for each of the images. The feature generation may include dividing images into patches and creating histograms of the patches, as described above.

At block 608, projecting is performed in the subspace or lower dimension. This is particularly applied in rough filtering as described. In the lower dimensional space or subspace, an image may be represented by a further compact hash code to reduce the calculation burden in similarity measurement.

At block 610, hash coding is performed to categorize duplicate and near duplicate images.

At block 612, near duplicate image detection is performed. The near duplicate detection may be performed using one or more of the techniques described above, and/or other processes.

At block 614, near duplicate images are collected. As described above, the collection may be an iterative process, which may refine the collection as the process is performed.

At block 616, generating a projection matrix is performed. A different projection matrix is generated for each process interation.

An Exemplary Computer Environment

Figure 7:
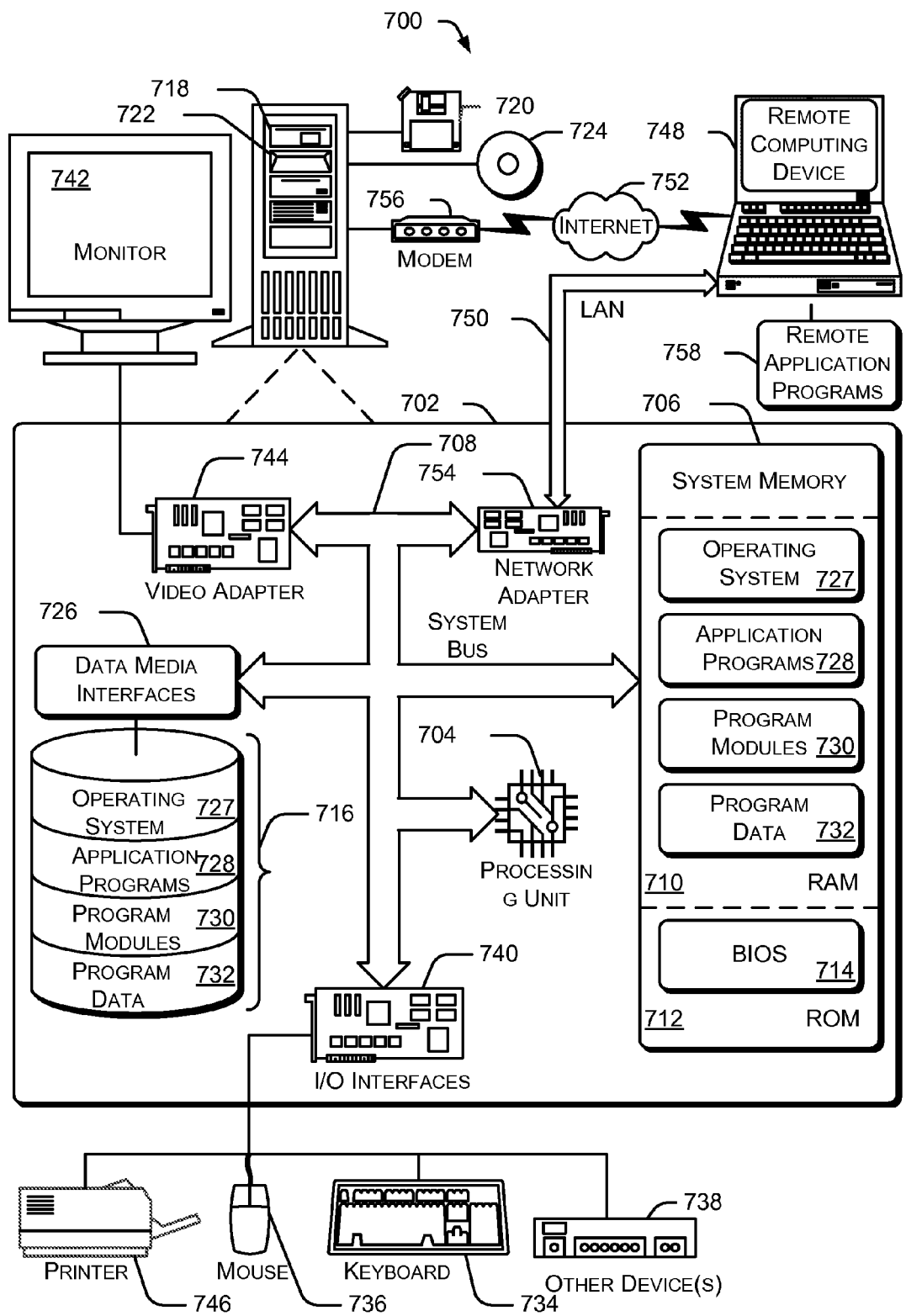
FIG. 7 is a block diagram illustrating an exemplary computing environment.

FIG. 7 illustrates an exemplary general computer environment 700, which can be used to implement the techniques described herein, and which may be representative, in whole or in part, of elements described herein. The computer environment 700 is only one example of a computing environment and is not intended to suggest any limitation as to the scope of use or functionality of the computer and network architectures. Neither should the computer environment 700 be interpreted as having any dependency or requirement relating to any one or combination of components illustrated in the example computer environment 700.

Computer environment 700 includes a general-purpose computing-based device in the form of a computer 702. Computer 702 can be, for example, a desktop computer, a handheld computer, a notebook or laptop computer, a server computer, a game console, and so on. The components of computer 702 can include, but are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 702 typically includes a variety of computer readable media. Such media can be any available media that is accessible by computer 702 and includes both volatile and non-volatile media, removable and non-removable media.

The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712 is illustrated. RAM 710 typically contains data and/or program modules that are immediately accessible to and/or presently operated on by the processing unit 704.

Computer 702 may also include other removable/non-removable, volatile/non-volatile computer storage media. By way of example, FIG. 7 illustrates a hard disk drive 716 for reading from and writing to a non-removable, non-volatile magnetic media (not shown). Furthermore FIG. 7 illustrates a magnetic disk drive 718 for reading from and writing to a removable, non-volatile magnetic disk 720 (e.g., a "floppy disk"), additionally FIG. 7 illustrates an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternately, the hard disk drive 716, magnetic disk drive 718, and optical disk drive 722 can be connected to the system bus 708 by one or more interfaces (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more applications 728, other program modules 730, and program data 732. Each of such operating system 726, one or more applications 728, other program modules 730, and program data 732 (or some combination thereof) may implement all or part of the resident components that support the distributed file system.

A user can enter commands and information into computer 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 704 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746, which can be connected to computer 702 via the input/output interfaces 740.

Computer 702 can operate in a networked environment using logical connections to one or more remote computers, such as a remote computing-based device 748. By way of example, the remote computing-based device 748 can be a personal computer, portable computer, a server, a router, a network computer, a peer device or other common network node, and the like. The remote computing-based device 748 is illustrated as a portable computer that can include many or all of the elements and features described herein relative to computer 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet.

When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote applications 758 reside on a memory device of remote computer 748. For purposes of illustration, applications and other executable program components such as the operating system are illustrated herein as discrete blocks, although it is recognized that such programs and components reside at various times in different storage components of the computing-based device 702, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for implementing remote auto provisioning and publication of applications have been described in language specific to structural features and/or methods, it is to be understood that the subject of the appended claims is not necessarily limited to the specific features or methods described. Rather, the specific features and methods are disclosed as exemplary implementations.

What is claimed is:

1. A method comprising:
   dividing a digital image into a plurality of equal size patches;
   dividing each patch of the plurality of equal size patches into eight texture directions;
   creating a feature vector for each patch of the plurality of equal size patches;
   determining a dominant gradient direction corresponding to each patch of the plurality of equal size patches;
   generating a texture histogram for each patch of the plurality of equal size patches based on the feature vector for each patch; and
   combining the histograms to create a combined histogram to represent the digital image.

2. The method of claim 1, wherein the dividing is into 8 by 8 (64) equal size patches.

3. The method of claim 1, wherein the creating uses one or more of the following as features: mean gray, color histogram, and texture histogram.

4. The method of claim 1, wherein the generating the texture histogram for each patch is performed without regard to color changes.

5. The method of claim 1 further comprising creating a hash code particular to the image based on Principle Component Analysis.

6. The method of claim 1 further comprising measuring similarity of the image with other images, using distance functions.

7. The method of claim 4, wherein distance functions include one or more of the following: Minkowski metrics, histogram cosine distance, and fuzzy logic.

8. A computer-readable memory including instructions that are executable by one or more processors to perform acts comprising:
   dividing a digital image into a plurality of patches, each patch of the plurality of patches having a same size;
   dividing each patch of the plurality of patches into eight texture directions;
   identifying a dominant gradient direction for each patch of the plurality of patches;
   creating a feature vector for each patch of the plurality of patches;
   generating a texture histogram for each patch of the plurality of patches based on each feature vector; and
   combining the texture histograms to create a combined histogram to represent the digital image.

9. The computer-readable memory of claim 8, wherein each feature vector is a 64-dimension feature vector.

10. The computer-readable memory of claim 9, further comprising reducing each 64-dimension feature vector into a 32-dimension feature vector.

11. The computer-readable memory of claim 8, wherein creating the feature vectors comprises:
   quantizing dimensions of the feature vectors into a binary value; and
   determining whether the dimensions are above a mean value.

12. The computer-readable memory of claim 8, wherein the feature vectors are associated with features that are unaffected by patch rotation, image scale change, and color change.

13. The computer-readable memory of claim 8, further comprising determining a dominant gradient direction of the image.

14. The computer-readable memory of claim 13, further comprising calculating a hash code based on the combined histogram.

15. A system comprising:
   a memory to store instructions; and
   one or more processors to execute the instructions to perform acts comprising:
      dividing a digital image into equal size patches;
      creating a feature vector for each of the patches;
      determining a dominant gradient direction corresponding to each of the patches;
      generating texture histograms for each of the patches based on each feature vector;
      combining the texture histograms using a coding scheme to create a hash code that represents the digital image; and
      comparing the hash code to additional hash codes associated with additional images.

16. The system of claim 15, further comprising identifying duplicate image and near duplicate images based on the comparing.

17. The method of claim 15, wherein the coding scheme includes projecting the features to a subspace.

18. The method of claim 17, wherein the subspace is represented by a compact hash code.

19. The method of claim 15, wherein the coding scheme includes a vector quantization.

* * * * *